United States Patent
Raymond et al.

(10) Patent No.: US 12,542,603 B2
(45) Date of Patent: Feb. 3, 2026

(54) SATELLITE SIGNAL OPTIMIZATION SYSTEM AND METHOD TO IDENTIFY AND CORRECT STB-RELATED SIGNAL DEGRADATION

(71) Applicant: DISH Network L.L.C., Englewood, CO (US)

(72) Inventors: Ted Raymond, Monee, IL (US); Alan Terry Pattison, Englewood, CO (US); Brent Gale, Englewood, CO (US); Scott D. Thums, Carpenter, WY (US); Darel Peacock, Cheyenne, WY (US)

(73) Assignee: DISH Network L.L.C., Englewood, CO (US)

( * ) Notice: Subject to any disclaimer, the term of this patent is extended or adjusted under 35 U.S.C. 154(b) by 308 days.

(21) Appl. No.: 18/493,638

(22) Filed: Oct. 24, 2023

(65) Prior Publication Data

US 2025/0132815 A1    Apr. 24, 2025

(51) Int. Cl.
*H04B 7/185* (2006.01)

(52) U.S. Cl.
CPC ..... *H04B 7/18519* (2013.01); *H04B 7/18513* (2013.01)

(58) Field of Classification Search
CPC .............................................. H04B 7/185–195
See application file for complete search history.

(56) References Cited

U.S. PATENT DOCUMENTS

| | | | | |
|---|---|---|---|---|
| 10,750,503 | B1* | 8/2020 | Freedman | H04W 72/563 |
| 2006/0154602 | A1* | 7/2006 | Lee | H04N 7/104 |
| | | | | 455/13.3 |
| 2009/0228930 | A1* | 9/2009 | Luu | H04N 21/26216 |
| | | | | 725/63 |
| 2018/0295405 | A1* | 10/2018 | Barnett, Jr. | H04N 21/4122 |
| 2020/0151023 | A1* | 5/2020 | Bai | H04L 41/5041 |
| 2021/0391920 | A1* | 12/2021 | Calder | H04L 27/2649 |
| 2023/0336475 | A1* | 10/2023 | Trujillo | H04L 41/042 |

\* cited by examiner

*Primary Examiner* — Raymond S Dean
(74) *Attorney, Agent, or Firm* — Seed Intellectual Property Law Group LLP

(57) ABSTRACT

A method for optimizing satellite signal performance in a satellite transmission system. The method includes: obtaining signal data from at least some of the plurality of customer receivers, measuring the signal data from each of the signal beams that were obtained; analyzing metadata from the components of the satellite transmission system, signal source front end controls, and spectral sampling; identifying signal degradation at one or more individual customer receivers from the signal data of the actual spot beam coverage while monitoring signal parameters over the diverse geographical region using the measured signal data and the analyzed metadata; and predicting a remediation action to correct the signal degradation at the one or more individual customer receivers.

20 Claims, 9 Drawing Sheets
(6 of 9 Drawing Sheet(s) Filed in Color)

SATELLITE SIGNAL OPTIMIZATION SYSTEM AND METHOD TO IDENTIFY AND CORRECT STB-RELATED SIGNAL DEGRADATION

BACKGROUND

The fields of modern space exploration and communication provide many exciting challenges and obstacles to be overcome. For example, orbiting satellite systems can provide enticing capabilities but also come with numerous difficulties. In this manner, many satellite systems are unreliable and cannot operate for very long without requiring substantial maintenance costs. Additionally, satellite systems can be prone to networking interruption, as well as single point of failure. Furthermore, many satellite systems require local monitoring and repair, which necessitates sending human operators with their associated costs. Without the constant monitoring and repair described above, signal quality will suffer and degrade, due to a variety of issues such as carrier-to-noise ratio and interference.

However, there are numerous factors that can result in sub-optimal or even unacceptable quality of satellite performance. Performance reducing factors can originate from numerous sources, such as Set Top Boxes, Uplink antenna, satellite configuration, and even the weather. Accordingly, in previous satellite systems it was extremely difficult, if not impossible, to identify and correct specific issues that were the driving factors of sub-optimal or even unacceptable space segment quality of satellite technology.

There is a continuing need for a system that identifies and corrects sub-optimal or unacceptable signal quality of satellite transmission technology. The present disclosure addresses this and other needs.

BRIEF SUMMARY

The present disclosure relates to a satellite signal optimization system and method for monitoring and control of satellite signal performance in a satellite transmission system, wherein components of the satellite transmission system include an uplink antenna, a satellite spacecraft, a plurality of downlink customer receivers, a data lake, and a monitoring and control system.

Briefly stated, embodiments described herein are directed towards a satellite signal optimization system method that includes: obtaining signal data at the data lake from at least some of the plurality of downlink customer receivers, wherein the signal data is obtained from downlink signal beams received at the plurality of customer receivers from the satellite spacecraft, wherein the plurality of downlink customer receivers are located across a diverse geographical region, and wherein the signal data include metadata; accessing the signal data at the data lake from the monitoring and control system; measuring the signal data from each of the signal beams that were obtained across the diverse geographical region; analyzing metadata from the components of the satellite transmission system, signal source front end controls, and spectral sampling; identifying signal degradation at one or more individual customer receivers from the signal data of the actual spot beam coverage while monitoring signal parameters over the diverse geographical region using the measured signal data and the analyzed metadata; correlating signal degradation to probable causes of the signal degradation at the one or more individual customer receivers; predicting remediation actions to correct the signal degradation at the one or more individual customer receivers; and executing the remediation actions to correct the signal degradation at the one or more individual customer receivers.

In some embodiments of the satellite signal optimization method, at least one of the remediation actions includes correcting misalignment of an antenna of the one or more individual customer receivers. In one or more embodiments, the executing of the at least one of the remediation actions that includes correcting the misalignment of the antenna of the one or more individual customer receivers, is in response to determining, based on a type of the signal degradation, that the probable cause of the signal degradation is a misalignment of the antenna of the one or more individual customer receivers. In another aspect of some embodiments, at least one of the remediation actions includes correcting software issues with the one or more individual customer receivers. In one or more embodiments, the executing of the at least one of the remediation actions that includes correcting software issues with the one or more individual customer receivers, is in response to determining, based on a type of the signal degradation, that the probable cause of the signal degradation is a software issue with the one or more individual customer receivers.

In still another aspect of some embodiments, at least one of the remediation actions includes correcting frequency issues with the one or more individual customer receivers. In one or more embodiments, the executing of the at least one of the remediation actions that includes correcting frequency issues with the one or more individual customer receivers, is in response to determining, based on a type of the signal degradation, that the probable cause of the signal degradation is frequency issues with the one or more individual customer receivers. In yet another aspect of some embodiments, at least one of the remediation actions includes correcting interference issues with the one or more individual customer receivers. In one or more embodiments, the executing of the at least one of the remediation actions that includes correcting interference issues with the one or more individual customer receivers, is in response to determining, based on a type of the signal degradation, that the probable cause of the signal degradation is interference issues with the one or more individual customer receivers.

Furthermore, in another aspect of some embodiments, the satellite signal optimization method further comprises: drawing penetration heat map with the signal data from actual spot beam coverage using the measured signal data and the analyzed metadata; comparing theoretical spot beam coverage to the actual spot beam coverage on the penetration heat map; and identifying signal degradation from the penetration heat map drawn from the signal data of the actual spot beam coverage and the comparison to the theoretical spot beam coverage. In another aspect of some embodiments, an artificial intelligence engine is trained with the signal data from actual spot beam coverage. In still another aspect of some embodiments of the satellite signal optimization method, an artificial intelligence engine is retrained with newly acquired signal data from actual spot beam coverage. In yet another aspect of some embodiments, the satellite signal optimization method further includes using artificial intelligence to redraw the penetration heat map with newly acquired signal data from actual spot beam coverage.

In another aspect of some embodiments of the satellite signal optimization method, at least one of the remediation actions includes sending a message to components that have been determined not to be a source of identified signal degradation that no corrective action is required for those components. For example, if the satellite spacecraft has been identified as the source of the signal degradation, the satellite signal optimization method sends messages to the uplink antenna system and downlink customer receivers informing them that they should not take corrective action since the satellite spacecraft is the source of the signal degradation. In still another aspect of some embodiments of the satellite signal optimization method, at least one of the remediation actions includes blocking components that have been determined not to be a source of identified signal degradation from taking a corrective action. For example, if the satellite spacecraft has been identified as the source of the signal degradation, the satellite signal optimization method initiates an operation that blocks the uplink antenna system and downlink customer receivers from taking corrective action since the satellite spacecraft is the source of the signal degradation.

In one or more embodiments, a satellite signal optimization system for monitoring and control of satellite signal performance in a satellite transmission system is disclosed. In one such embodiment, the components of the satellite transmission system include an uplink antenna, a satellite spacecraft, a plurality of downlink customer receivers, a data lake, and a monitoring and control system. The satellite signal optimization system includes one or more processors and a memory device that stores a set of computer instructions. When the computer instructions are executed by the one or more processors, it causes the satellite signal optimization system to: obtain signal data at the data lake from at least some of the plurality of downlink customer receivers, wherein the signal data is obtained from downlink signal beams received at the plurality of customer receivers from the satellite spacecraft, wherein the plurality of downlink customer receivers are located across a diverse geographical region, and wherein the signal data include metadata; access the signal data at the data lake from the monitoring and control system; measure the signal data from each of the signal beams that were obtained across the diverse geographical region; analyze metadata from the components of the satellite transmission system, signal source front end controls, and spectral sampling; identify signal degradation at one or more individual customer receivers from the signal data of the actual spot beam coverage while monitoring signal parameters over the diverse geographical region using the measured signal data and the analyzed metadata; correlate signal degradation to probable causes of the signal degradation at the one or more individual customer receivers; predict remediation actions to correct the signal degradation at the one or more individual customer receivers; and execute the remediation actions to correct the signal degradation at the one or more individual customer receivers.

In some embodiments of the satellite signal optimization system, at least one of the remediation actions includes correcting misalignment of an antenna of the one or more individual customer receivers. In another aspect of some embodiments, at least one of the remediation actions includes correcting software issues with the one or more individual customer receivers. In still another aspect of some embodiments, at least one of the remediation actions includes correcting frequency issues with the one or more individual customer receivers. In yet another aspect of some embodiments, at least one of the remediation actions includes correcting interference issues with the one or more individual customer receivers.

Furthermore, in another aspect of some embodiments, the satellite signal optimization system includes further instructions in the memory device that, when executed by the one or more processors, further cause the one or more processors to: draw penetration heat map with the signal data from actual spot beam coverage using the measured signal data and the analyzed metadata; compare theoretical spot beam coverage to the actual spot beam coverage on the penetration heat map; and identify signal degradation from the penetration heat map drawn from the signal data of the actual spot beam coverage and the comparison to the theoretical spot beam coverage. In another aspect of some embodiments, an artificial intelligence engine is trained with the signal data from actual spot beam coverage. In still another aspect of some embodiments of the satellite signal optimization method, an artificial intelligence engine is retrained with newly acquired signal data from actual spot beam coverage. In yet another aspect of some embodiments, the satellite signal optimization method further includes using artificial intelligence to redraw the penetration heat map with newly acquired signal data from actual spot beam coverage.

In another aspect of some embodiments of the satellite signal optimization system, at least one of the remediation actions includes sending a message to components that have been determined not to be a source of identified signal degradation that no corrective action is required for those components. For example, if the satellite spacecraft has been identified as the source of the signal degradation, the satellite signal optimization method sends messages to the uplink antenna system and downlink customer receivers informing them that they should not take corrective action since the satellite spacecraft is the source of the signal degradation. In still another aspect of some embodiments of the satellite signal optimization method, at least one of the remediation actions includes blocking components that have been determined not to be a source of identified signal degradation from taking a corrective action. For example, if the satellite spacecraft has been identified as the source of the signal degradation, the satellite signal optimization method initiates an operation that blocks the uplink antenna system and downlink customer receivers from taking corrective action since the satellite spacecraft is the source of the signal degradation.

In another embodiment, a satellite signal optimization method is disclosed for monitoring and control of satellite signal performance in a satellite transmission system. In one such embodiment, the components of the satellite transmission system include an uplink antenna, a satellite spacecraft, a plurality of downlink customer receivers, a data lake, and a monitoring and control system. The satellite signal optimization method includes: obtaining signal data from at least some of the plurality of downlink customer receivers, wherein the signal data is obtained from downlink signal beams received at the plurality of customer receivers from the satellite spacecraft, wherein the plurality of downlink customer receivers are located across a diverse geographical region; measuring the signal data from each of the signal beams that were obtained from the plurality of customer receivers; analyzing metadata from the components of the satellite transmission system, signal source front end controls, and spectral sampling; identifying signal degradation at one or more individual customer receivers from the signal data of the actual spot beam coverage while monitoring signal parameters over the diverse geographical region using the measured signal data and the analyzed metadata; and predicting a remediation action to correct the signal degradation at the one or more individual customer receivers.

In some embodiments of the satellite signal optimization method, at least one of the remediation actions includes correcting misalignment of an antenna of the one or more individual customer receivers. In another aspect of some embodiments, at least one of the remediation actions includes correcting software issues with the one or more individual customer receivers. In still another aspect of some embodiments, at least one of the remediation actions includes correcting frequency issues with the one or more individual customer receivers. In yet another aspect of some embodiments, at least one of the remediation actions includes correcting interference issues with the one or more individual customer receivers.

Furthermore, in another aspect of some embodiments, the satellite signal optimization method further comprises: drawing penetration heat map with the signal data from actual spot beam coverage using the measured signal data and the analyzed metadata; comparing theoretical spot beam coverage to the actual spot beam coverage on the penetration heat map; and identifying signal degradation from the penetration heat map drawn from the signal data of the actual spot beam coverage and the comparison to the theoretical spot beam coverage. In another aspect of some embodiments, an artificial intelligence engine is trained with the signal data from actual spot beam coverage. In still another aspect of some embodiments of the satellite signal optimization method, an artificial intelligence engine is retrained with newly acquired signal data from actual spot beam coverage. In yet another aspect of some embodiments, the satellite signal optimization method further includes using artificial intelligence to redraw the penetration heat map with newly acquired signal data from actual spot beam coverage.

In another aspect of some embodiments of the satellite signal optimization method, at least one of the remediation actions includes sending a message to components that have been determined not to be a source of identified signal degradation that no corrective action is required for those components. For example, if the satellite spacecraft has been identified as the source of the signal degradation, the satellite signal optimization method sends messages to the uplink antenna system and downlink customer receivers informing them that they should not take corrective action since the satellite spacecraft is the source of the signal degradation. In still another aspect of some embodiments of the satellite signal optimization method, at least one of the remediation actions includes blocking components that have been determined not to be a source of identified signal degradation from taking a corrective action. For example, if the satellite spacecraft has been identified as the source of the signal degradation, the satellite signal optimization method initiates an operation that blocks the uplink antenna system and downlink customer receivers from taking corrective action since the satellite spacecraft is the source of the signal degradation.

BRIEF DESCRIPTION OF THE DRAWINGS

The patent or application filed contains at least one drawing executed in color. Copies of this patent or patent application publication with color drawing(s) will be provided by the Office upon request and payment of the necessary fee.

The components in the drawings are not necessarily to scale relative to each other. Like reference numerals designate corresponding parts throughout the several views.

DETAILED DESCRIPTION

Each of the features and teachings disclosed herein may be utilized separately or in conjunction with other features and teachings to provide a System and Method For Satellite Signal Optimization. Representative examples utilizing many of these additional features and teachings, both separately and in combination, are described in further detail with reference to the attached FIGS. 1-9. This detailed description is intended to teach a person of skill in the art further details for practicing aspects of the present teachings and is not intended to limit the scope of the claims. Therefore, combinations of features disclosed in the detailed description may not be necessary to practice the teachings in the broadest sense, and are instead taught merely to describe particularly representative examples of the present teachings.

Figure 1:
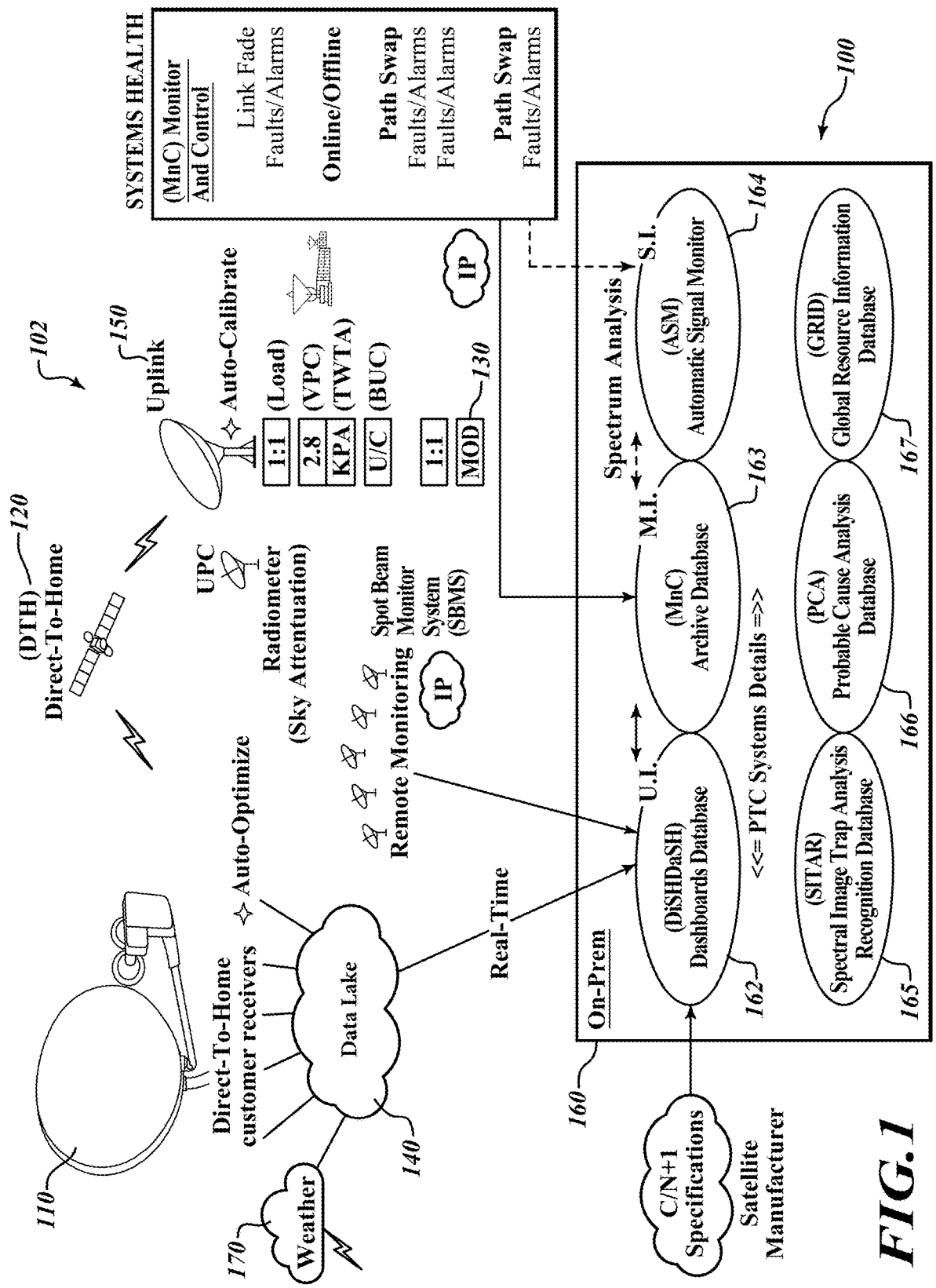
FIG. 1 is a system diagram illustrating the satellite, up link, and customer system architecture for a system and method for Monitoring Space Segment performance and Signal Quality using Customer STB Signal Strength information, according to one example embodiment.

Referring to FIG. 1, a satellite transmission system 102 is shown. In some embodiments, the components of the satellite transmission system 102 include a modulator 130, an uplink antenna 150, a satellite spacecraft 120, and a plurality of downlink customer receivers 110. The modulator 130 is located at the directional uplink center where the transmission energy is generated. The uplink antenna 150 sends transmission signal data from the ground to the satellite spacecraft 120. The satellite spacecraft 120 then retransmits the signal data back down to the terrestrial plurality of downlink customer receivers 110. This signal data is then used by each customer for the Direct Broadcast Satellite (DBS) TV. In legacy systems, this signal data was only used for the DSS TV; however, the satellite signal optimization system 100 collects this signal data from the plurality of downlink customer receivers 110 at a data lake 140 for monitoring and control by a central OnPrem control system 160.

In some embodiments, the satellite signal optimization system 100 uses custom experience data (e.g., customer STB signal strength information), uplink antenna data, and satellite performance data (as well as other signal transmission related data), to optimize antenna and satellite performance for customers. Satellite systems are a common method for TV signal distribution to cover large areas on the earth. Such satellites are placed at the height of about 22,000 miles from earth, where they are used as relay stations. The TV signal is distributed by first up-converting to a higher microwave frequency and then transmitting the up-converted signal to the satellites using directional uplink antennas. The satellites receive these uplink signals and translate them to other RF carrier frequencies. The translated signals are then transmitted back down to receiving antennas and associated Set Top Boxes (STB) of ground-based customers from the space-based satellites as Direct Broadcast Satellite (DBS) TV.

Some satellite systems employ low noise amplifiers in the Set Top Boxes and have a small dish antenna that provides high quality video and audio using spot beam transmission. Spot beam is a type of satellite communications in which signals of a satellite are targeted at a specific point on the Earth's surface. Since spot beams are more concentrated in power than a wide conus beam, the receiver of the spot beam receives a stronger signal. Additionally, since the coverage area is smaller, there is a reduced risk of interference with other transmissions using the same frequencies. Spot beams are often used in satellite television, as well as uplinks and downlinks between a satellite and a specific transponder. However, since spot beams are more focused in their coverage area, misalignment of spot beam transmissions results in larger signal degradation and lower signal quality.

The uplink signal from a directional uplink antenna is received by the satellite, down converted, and amplified using a transponder module. The down-converted lower frequency signal is transmitted back to earth. The STB provides the signal to the consumer TV set. In some embodiments, the STB includes an antenna, a low noise amplifier, a down converter, and IF circuitry. Additionally, the satellite receiver has control circuits to change the position of the satellite dish antenna.

The quality of the Space Segment plays a substantial role in the success of Geo-Stationary Orbit (GSO) satellite signal transmission technology. Additionally, automated monitoring and control also plays a role in the success of spectrum for GSO satellite signal transmission technology. In this manner, the delivered spectrum may be maximized via frequency reuse. For example, the carrier-to-noise ratio from the space segment (i.e., the satellite spacecraft) is monitored and calibrated to ensure that signal quality is providing an acceptable signal uptime experience. Furthermore, the self-generated interference signal quality from the satellite spacecraft is also often monitored and calibrated to ensure that signal quality is providing an acceptable signal uptime experience.

Referring now to FIG. 1, the satellite signal optimization system 100 includes a network of Internet-connected, downlink customer receivers (i.e., STBs) 110 that are spread across a diverse geographical region, (e.g., a state, several states, the 48 contiguous states, the entire United States, and the like). In some embodiments, a diverse geographical region is defined as a geographical area that can receive signals from a satellite or a geographical area defined by an administrator. As shown in FIG. 1, the STBs 110 are represented by a satellite dish. Notably, the satellite dish shown in FIG. 1 represents multiple STBs 110 (i.e., the Direct to Home customer receivers) with a single STB being used for each customer. In one or more embodiments, each downlink customer receiver 110 comprises an antenna, a receiver, a demodulator, and a decoder as a monitoring system. In some such embodiments, each downlink customer receiver 110 also includes a memory for storing customer experience data, signal strength data, telemetry data, and any other data that has been transmitted by the satellite system. The antenna of the downlink customer receiver 110 is used to receive signals from the transmitting satellite spacecraft 120. The receiver of the downlink customer receiver 110 demodulates and decodes the signals to extract the signal strength data. The monitoring system of the satellite signal optimization system 100 analyzes the telemetry data to determine the satellite spacecraft's pointing accuracy, input aggregate power, the ground systems budget performance, and signal quality against GSO atmospheric conditions and terrestrial attributes, using data and metadata obtained from the downlink customer receiver 110.

In the past, a satellite television company could only see uplink data, but not downlink data, customer experience data, satellite data, or any other performance data, for a Direct Broadcast Satellite (DBS) system. Accordingly, the satellite television companies would be forced to rely on theoretical data from satellite manufacturer companies regarding space segment transponder specifications. Additionally, the only "data" that satellite television companies typically obtain from customers (i.e., ground segment data) is generic complaints when their systems are not performing at desired levels.

In some embodiments of the satellite signal optimization system 100, Spot Beam Satellites 120 are incorporated into the satellite transmission system 102. In such embodiments, data (and metadata) derived from signals received from the Spot Beam Satellites 120 is collected from all of the customer downlink customer receiver 110, as well as other components in the DBS system. In this manner, not only is uplink data stored, but also STB data, service quality data, downlink data, space segment data, software performance data, and any other data source in the system. The metadata within this data is used to identify the data source, i.e., the metadata may be used to distinguish the uplink data, STB data, service quality data, downlink data, space segment data, software performance data, and any other data source in the system.

This data (and metadata) is fed to a data lake 140, which is a centralized repository of all of the structured and unstructured data from the system. This data lake 140 may be located in a Private Cloud, such as an AWS Private Cloud (or any other appropriate location). This includes the data and metadata from all of the Set Top Boxes 110 "phoning home", i.e., communicating with the central control system of the satellite transmission system 102. This vast quantity of diverse stored data is monitored, which enables the satellite signal optimization system 100 to see exactly what the satellite service is doing over the course of the satellite transmission for complete end-to-end monitoring of all components of the DBS system (including service quality). The satellite signal optimization system 100 creates a closed loop of data information in the system components by making the data from all of the STBs 110 accessible from a centralized location, e.g., the data lake 140.

Referring now to another aspect, the end-to-end monitoring of the satellite signal optimization system 100 is followed by analysis of this end-to-end data to determine system performance and health. Then, if any system performance or maintenance issues are identified and diagnosed, corrective action may be determined and implemented by the satellite signal optimization system 100. Furthermore, these corrective or remediation actions are implemented via computer automation, rather than human intervention. Additionally, adjustments can then be made in real time to address any issues that were identified in the system, potentially even before the issues are noticed by the customer. Performance reducing factors can originate from directional antenna issues, uplink issues, satellite configuration issues, downlink issues, Set Top Boxes issues, weather issues, component placement issues, and component orientation issues. The satellite signal optimization system 100 sees and monitors the data in each of these components (satellite spacecraft 120, uplink antenna 150, downlink components, STBs 110, etc.).

In some embodiments, the end-to-end monitoring of the satellite transmission system 102 by the satellite signal optimization system 100, begins with the modulation 130 at the directional uplink center where the transmission energy is generated. The satellite signal optimization system 100 also monitors data and metadata from the directional uplink antennas 150, such as their pointing direction (e.g., azimuth, elevation, angle, etc.), antenna position (e.g., Global Positioning System (GPS) location of the uplink antenna), antenna calibration, and spectrum delta per signal. The satellite signal optimization system 100 further monitors the uplink transmission process and records the relevant data. Such uplink transmission data includes sky attenuation date (e.g., including sky temperature measurement), as well as aggregate output power data. This data monitoring and analysis enables fine tuning of the uplink band being used by the customer. Power level changes may also be implemented in order to punch the uplink signal through a weather pattern. However, such power changes need to be balanced so as to prevent interference with other power signals due to these power changes. The data and metadata obtained by the satellite signal optimization system 100 enables this balancing to be performed.

The satellite signal optimization system 100 also monitors the space segment transmissions from the data (and metadata) derived from signals received from the satellite spacecraft 120 that are collected from the customer STBs 110. For example, the satellite signal optimization system 100 monitors space loss attenuation and aggregate input power data from the data (and metadata) derived from signals received from the satellite spacecraft 120. Additionally, the satellite signal optimization system 100 monitors and controls the flow density of the Carrier/Noise Ratio from the data (and metadata) collected from the customer STBs 110. Additionally, the satellite signal optimization system 100 performs automated optimization of the signal in the space segment transmissions.

In another aspect, the satellite signal optimization system 100 monitors downlink transmission degradation from the data (and metadata) derived from the downlink transmission signals received from the satellite spacecraft 120, which are collected from the customer STBs 110. For example, the satellite signal optimization system 100 identifies sky attenuation and weather interference. In this manner, the satellite signal optimization system 100 collects customer experience data and metadata from the downlink customer receivers 110 for remote quality analysis. This customer experience data and metadata may also be used by the satellite signal optimization system 100 to produce a penetration heat map of the spot beam signals. Specifically, in the satellite signal optimization system 100, the customer experience data, signal strength data, telemetry data, space segment data, and any other data and metadata that is collected by the STBs 110 is continuously backed up to the data lake 140, where it is stored and accessible by the OnPrem architecture 160 of the satellite signal optimization system 100. The data lake 140 aggregates all of the data and metadata assembled from the downlink customer receivers 110, as well as all transponders, receivers, and tuners with which the STBs are in communication. These downlink customer receivers 110 provide vast quantities of data and metadata that enable accurate bandwidth analysis. Accordingly, this vast quantity of data and metadata can be used to quantify what the signal transmission beams look like. This aggregated data and metadata enables real-time analysis, power level monitoring, antenna status monitoring, etc., to optimize signal quality of the satellite transmissions and also minimize interference.

Additionally, in one or more embodiments, the satellite signal optimization system 100 monitors weather patterns 170 so that their effect on the satellite transmission system 102 may be mitigated. Since water absorbs microwave signals, severe weather patterns can result in signal degradation. Thus, in one aspect of some embodiments, the satellite signal optimization system 100 analyzes weather patterns 170 to identify signal loss due to the server weather blocking the uplink transmission signals. In another aspect of some embodiments, the satellite signal optimization system 100 identifies STBs 110 that are no longer phoning home due to server weather either blocking the downlink transmission signals or the knocking the receiving antennas of the STBs 110 out of alignment.

Notably, in an aspect of some embodiments, the satellite signal optimization system 100 is configured to implement remedial measures to compensate for such weather issues. For example, such remedial measures may include at the uplink antenna stage, the aggregate output power at the uplink antenna 150 can be increased to "punch" through a weather pattern 170. Alternatively, the system can employ redundant diversity weather pattern antenna locations, and the active uplink process can be moved from one antenna at a bad weather location to another antenna at a good weather location. On the back end of the system, some embodiments of the satellite signal optimization system 100 are configured to identify signal outages after a weather pattern 170 (e.g., storm) has passed, by comparing this signal penetration information to archived signal penetration information just prior to the weather pattern. In this manner, if there was quality signal strength shown as being received by a set of STBs 110 just prior to a weather pattern 170 and degraded signal strength or no signal at all just after the weather pattern passes, then the satellite signal optimization system 100 can determine that the weather pattern 170 is responsible for component misalignment and/or initiate remedial measures (e.g., component realignment).

Referring now to FIGS. 1-7, in some embodiments of the satellite signal optimization system 100, the data and metadata from the Spot Beam Satellites 120 is collected in a data lake 140 from all of the customer downlink customer receivers 110, as well as other components in the DBS system. Thus, the satellite signal optimization system 100 analyzes and visualizes STB customer experience data and metadata, as well as uplink data and metadata, service quality data and metadata, downlink data and metadata, space segment data and metadata, software performance data and metadata, and any other data source in the system. Specifically, the satellite signal optimization system 100 enables the display of a penetration heat map of a broad geographic region (e.g., the United States) with every data point on the penetration heat map representing a downlink customer receiver 110 that is communicating (e.g., "phoning home") to the satellite transmission system 102 within the spot beam coverage.

Figure 2:
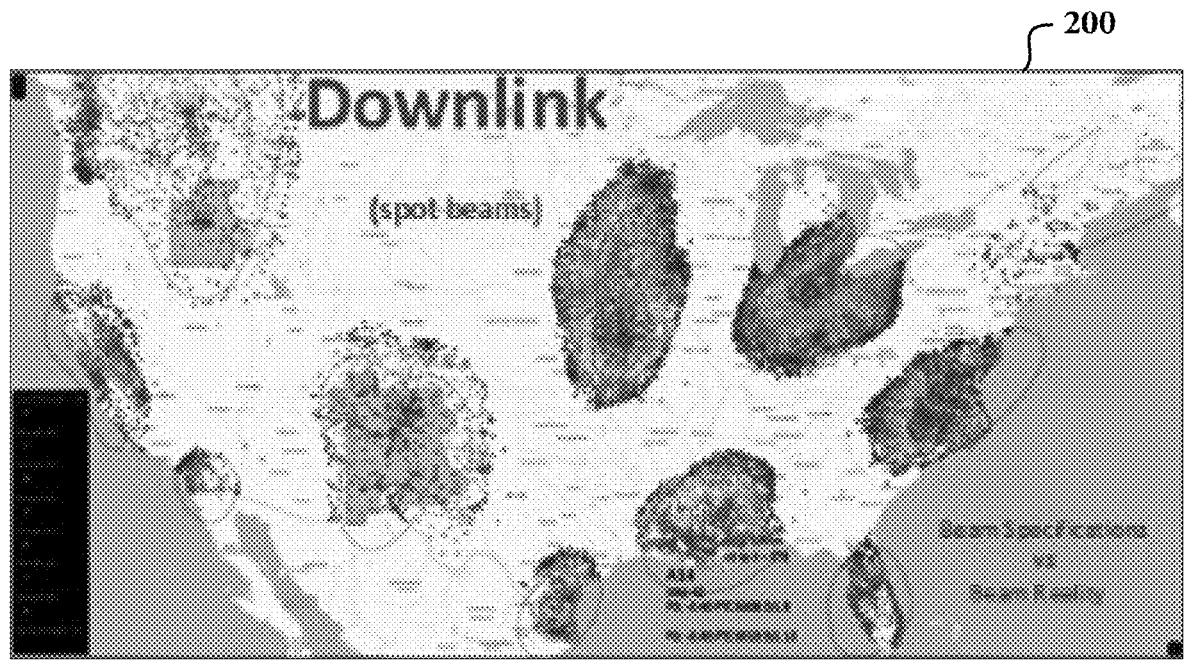
FIG. 2 is an example of a spot beam penetration heat map, according to one example embodiment.
Figure 3:
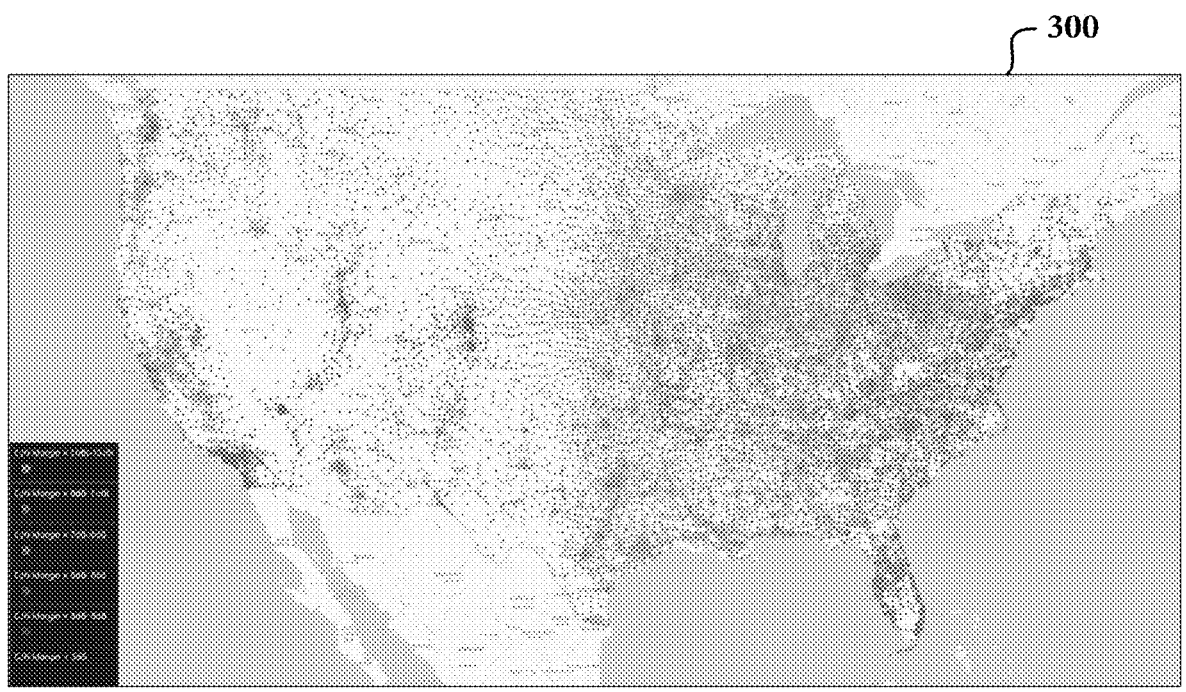
FIG. 3 is an example of a penetration heat map for a Conus Transponder, according to one example embodiment.
Figure 4:
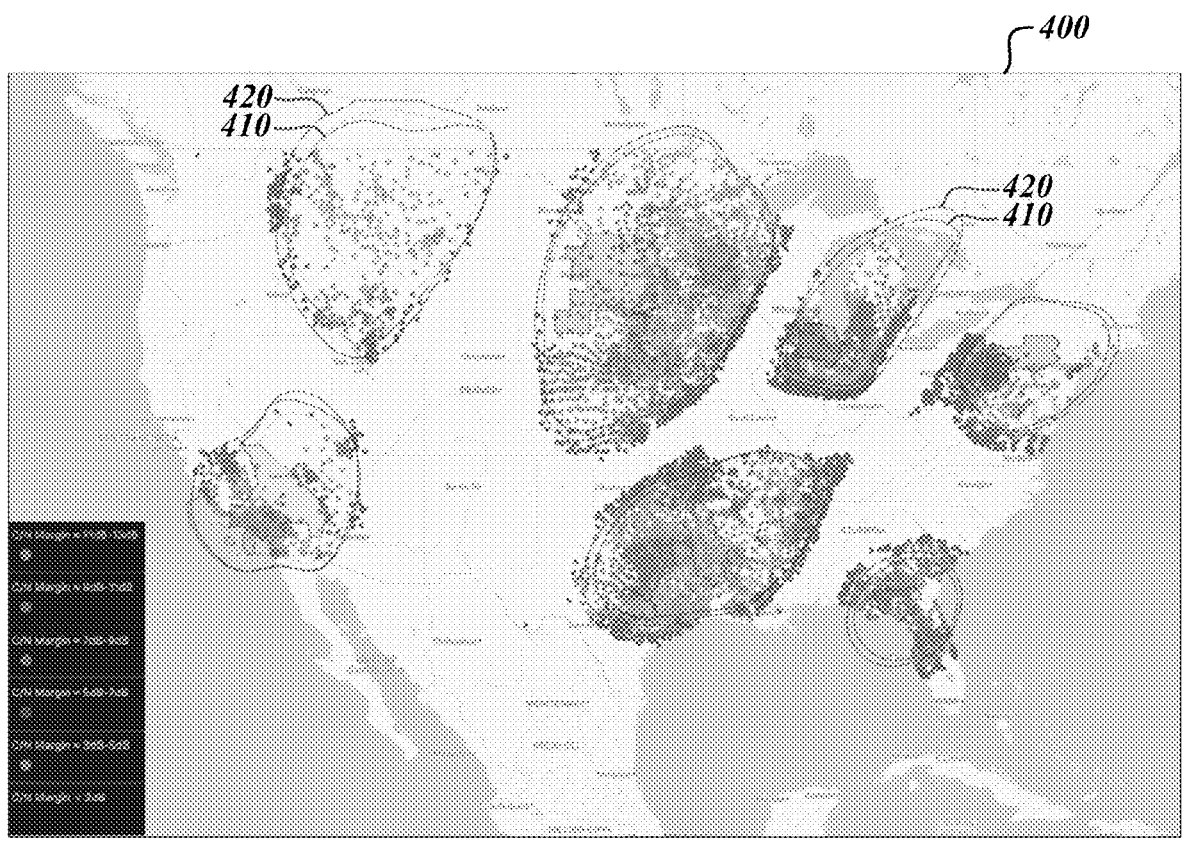
FIG. 4 is an example of a penetration heat map for a spot beam Transponder, according to one example embodiment.
Figure 5:
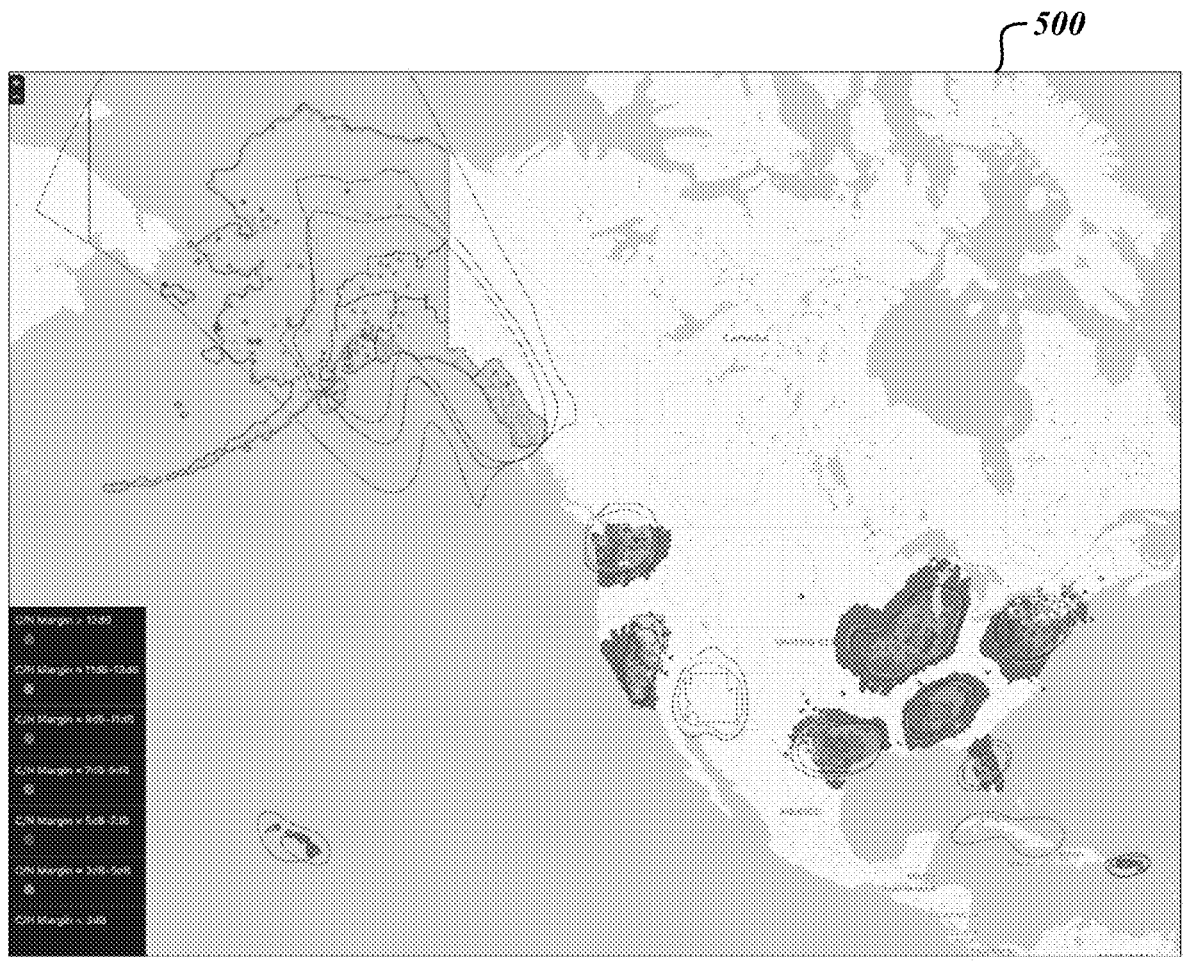
FIG. 5 is an example of a penetration heat map for a spot beam Transponder with Alaska, Hawaii, and Puerto Rico.

FIG. 2 shows an example of a spot beam penetration heat map 200, while in comparison, FIG. 3 shows an example of a penetration heat map 300 for a Conus Transponder. FIG. 4 shows an example of a penetration heat map 400 for a spot beam Transponder that is covering the 48 contiguous United States, while FIG. 5 shows an example of a penetration heat map 500 for a spot beam Transponder that is covering the 48 contiguous United States, as well as Alaska, Hawaii, and Puerto Rico.

In some embodiments (for example, FIG. 4), the penetration heat map 400 of the satellite signal optimization system 100 provides detailed information on the actual signal transmission performance from every connected STB with respect to their respective transponders and satellites. While the penetration heat map 400 of the satellite signal optimization system 100 displays the theoretical beam coverage boundaries that are received from the satellite manufacturer (shown in blue somewhat oval shapes 410). Significantly, the penetration heat map 400 of the satellite signal optimization system 100 also displays the actual beam coverage boundaries (shown in red somewhat oval shapes 420) using the signal transmission performance data. Thus, the penetration heat map 400 of the satellite signal optimization system 100 redraws the beam coverage boundaries using actual signal transmission performance data.

Due to the large quantity of data being obtained from the STBs 110 via the data lake 140, in some embodiments of the satellite signal optimization system 100, a machine learning engine can be effectively trained to redraw the actual beam coverage boundaries 420 using actual signal transmission performance data. Additionally, since large quantities of data and metadata are being continuously obtained from the STBs 110 via the data lake 140, the machine learning engine of the satellite signal optimization system 100 can be subsequently and repeatedly retrained to redraw the actual beam coverage boundaries 420 using actual signal transmission performance data.

Without these actual beam coverage boundaries, a satellite television distribution system is not able to determine the parameters of where their signal is actually being sent and received. Therefore, the actual beam coverage boundaries of the satellite signal optimization system 100 enables the determination of whether or not designated market areas 630 (as shown in green in FIGS. 6 and 7) are being sufficiently provided with adequate signal coverage. Moreover, the determination of the actual beam coverage boundaries by the satellite signal optimization system 100 enables unused bandwidth (i.e., signal coverage that is being provided outside of the designated market areas) to be identified and utilized. Thus, the satellite signal optimization system 100 optimizes actual bandwidth allocation instead of relying on theoretical bandwidth allocation from a satellite spacecraft manufacturer.

Figure 6:
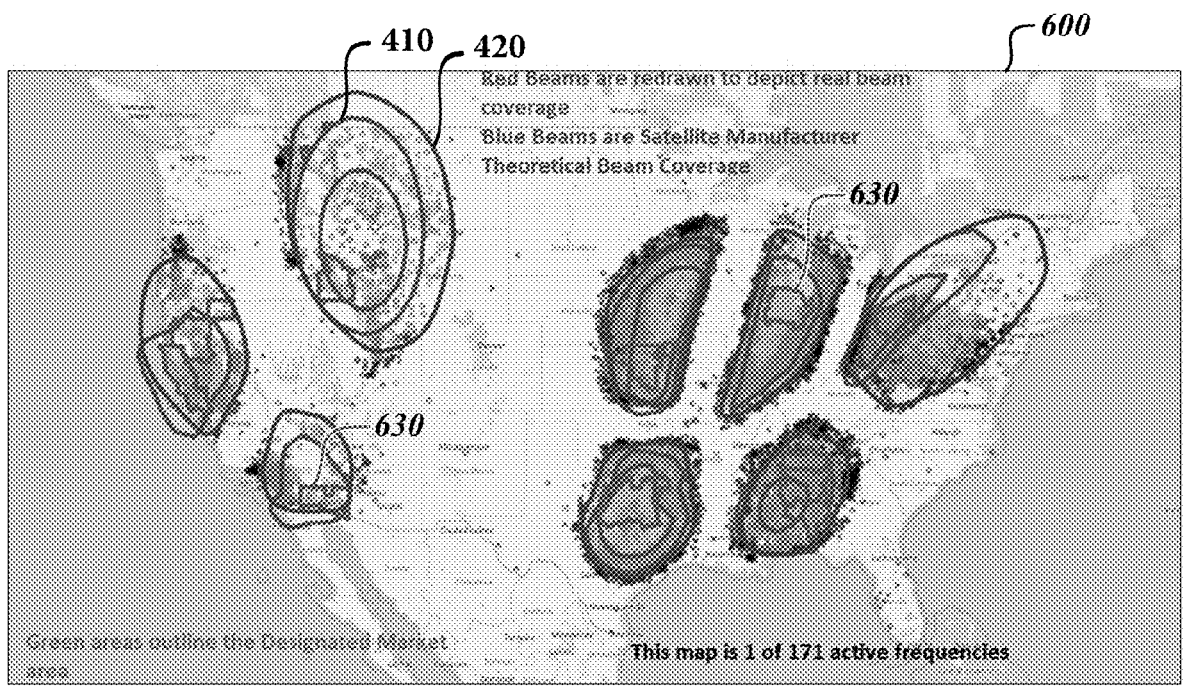
FIG. 6 is an example of a penetration heat map displaying theoretical beam coverage versus real beam coverage, according to one example embodiment.

Thus, in some embodiments shown in FIG. 6, the satellite signal optimization system 100 is configured to determine link margin performance per designated market area 630. This performance data may then be used to correlate to the footprint of the signal transmission as shown on the penetration heat map 600 in FIG. 6. Alerts may then be sent by the satellite signal optimization system 100 to identify poor performance data for the footprint of the satellite signal transmission. Additionally, in some embodiments of the satellite signal optimization system 100, the link margin performance data per designated market area 630 is sent to bandwidth management teams (or automated systems) for revenue optimization guidance, including recommendations for alternative application of resources due to excess or sub-optimally distributed capacity. Moreover, the link margin performance data per designated market area 630 is viewable in contrast to theoretical beam coverage boundary 410 and the actual beam coverage boundary 420, which were produced using the signal transmission performance data.

FIG. 6 shows an example of a penetration heat map for one of 171 active frequencies. FIG. 6 also displays theoretical beam coverage boundary 410 that is shown as blue oval shapes in comparison to the display of real beam coverage boundary 420 that is shown as red oval shapes. The green areas on the penetration heat map show the designated market areas 630 that the satellite transmission system 102 is trying to cover.

Figure 7:
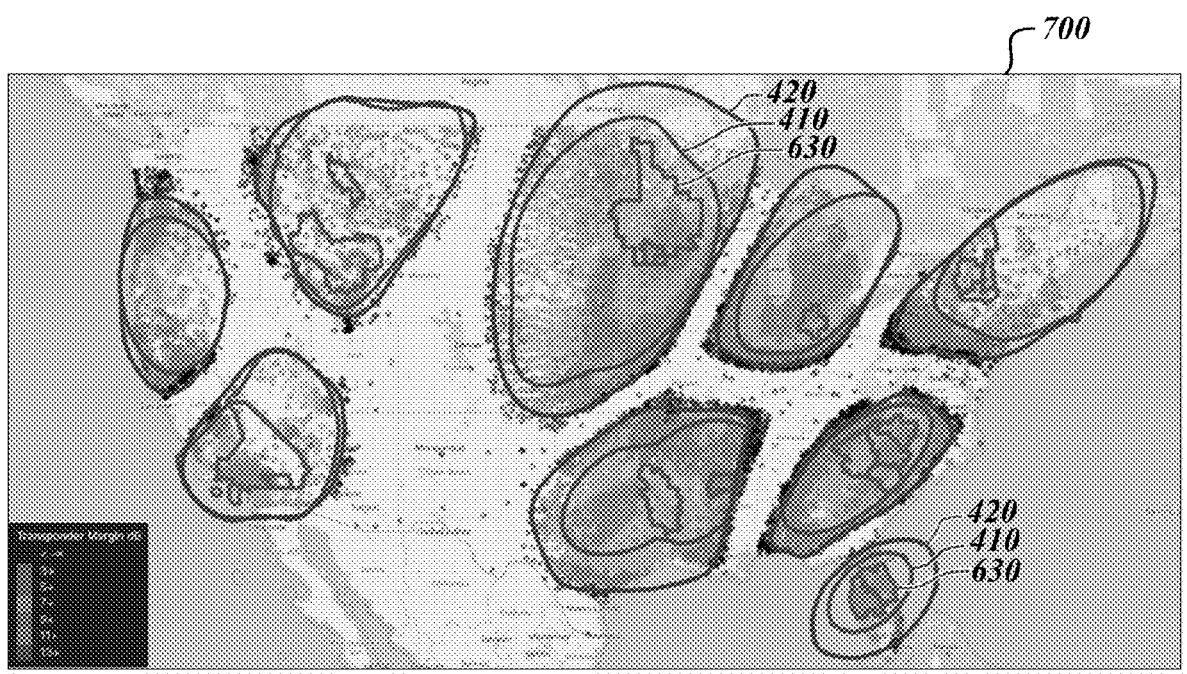
FIG. 7 is another example of a penetration heat map displaying theoretical beam coverage versus real beam coverage, according to one example embodiment.

FIG. 7 shows another example of a penetration heat map for a different one of 171 active frequencies. Notably, this active frequency provides coverage in Florida. Again, FIG. 7 also displays theoretical beam coverage boundaries 410 that are shown as blue oval shapes in comparison to the display of real beam coverage boundaries 420 that are shown as red oval shapes. As in FIG. 6, the green areas on the penetration heat map in FIG. 7 show the designated market areas 630 that the satellite transmission system 102 is trying to cover.

In some embodiments shown in FIGS. 6 and 7, purple dots on the penetration heat map represent the best coverage (e.g., highest dBs), green dots on the penetration heat map represent the second best coverage, blue dots on the penetration heat map represent the third best coverage, yellow dots on the penetration heat map represent the fourth best coverage, orange dots on the penetration heat map represent the fifth best coverage, orange dots on the penetration heat map represent the sixth best coverage, and black dots on the penetration heat map represent the worse coverage (e.g., lowest dBs) that is still measurable.

In this manner, the penetration heat map of the satellite signal optimization shows the "state" of the signal transmission service (e.g., very bad, bad, average, good, very good) across the whole satellite television distribution system (e.g., the 48 contiguous states). In some embodiments, the various readings on the penetration heat map of the satellite signal optimization system enable the data analysis, signal degradation identification, probable cause of the signal degradation, and implementation of remediation action for the identified signal degradation. Thus, when there is degradation of a particular spot beam or a region of spot beams, determination of the failure point or points may be identified. Notably, the satellite signal optimization system provides the technological improvement that this identification and remediation (e.g., correction, mitigation, etc.) of a signal transmission problem can be achieved before the satellite television customers know there is a problem.

Referring now to FIGS. 1 and 7, the STBs 110 feed vast quantities of signal related data and metadata to the satellite signal optimization system 100, which is used to generate the penetration heat map. The penetration heat map 700 presents a visual representation of the bandwidth analysis and signal transmission degradation analysis performed by the satellite signal optimization system 100. This analysis may be performed either in real-time or within a short period of time after data upload (e.g., minutes, hours, a day, or a few days). For example, as shown on the penetration heat map 700, the satellite signal optimization system 100 uses data and metadata from the STBs 110 to distinguish individual STB signal degradation issues, from local signal degradation issues, from regional signal degradation issues, from wide area signal degradation issues. In this regard, if the signal degradation is only at one STB 110 (i.e., downlink customer receiver) and the surrounding STBs seen on the penetration heat map show no signs of signal degradation, then an individual STB issue may be identified (e.g., poor installation, individual hardware problem, etc.). Additionally or alternatively, in some embodiments, metadata may be used to identify the type or source of the signal degradation.

In some embodiments of the satellite signal optimization system 100, signal degradation at the individual STB 110 level is identified. Additionally, the satellite signal optimization system 100 is able to correct the signal degradation at the individual STB 110 level due to causes such as poor STB installation, obstructions, new construction, antenna misalignment, degrading cable installation, and the like. In one or more embodiments, the satellite signal optimization system 100 sends automatic alerts correlated to identified degradation at signal receival. In some embodiments, such alerts include zip code and installation type, and are sent to antenna installation centers for installation performance guidance. Additionally, the satellite signal optimization system 100 generates automatic reports to identify individual installations as below standard. These individual installations that are identified as below standard may be compared to surrounding installations by zip code, county, DMA, and the like, to distinguish individual downlink customer receiver issues from regional issues. Individual downlink customer receiver issues that may be identified and isolated include degradation at customer locations due to obstructions, new construction, receiver/antenna misalignment, degrading cable installation, customer receiver software issues, customer receiver frequency issues, and the like.

Continuing, if the signal degradation is localized in small geographical area of STBs 110 and the surrounding STBs seen on the penetration heat map 700 show reduced signs of signal degradation, then a localized signal degradation may be identified (e.g., a small pattern of server weather, etc.). Additionally, if the signal degradation is from a regional geographical area of STBs 110, then a regional failure issue may be identified (e.g., uplink antenna beam issue, uplink antenna orientation issue, large pattern of server weather, etc.). Such uplink antenna issues may be remediated by adjusting uplink power and/or adjusting the antenna configuration to correct for these poor regional STB readings. Additionally, penetration heat maps from different time periods (i.e., before and after a server weather event) may be used to identify if a region of STBs have been knocked out of position by the server weather. Additionally or alternatively, in some embodiments, metadata may be used to identify the type or source of the signal degradation.

Furthermore, if the signal degradation covers a wide geographical area of STBs 110, then a wide signal degradation issue may be identified (e.g., a satellite problem such as pitch, roll, loss of orbit). Any kind of anomaly or attitude disturbance on a satellite spacecraft 120 can disrupt the pointing of the beams on the satellite spacecraft. Such satellite spacecraft issues may be remediated by reconfiguring the satellite components to correct for these poor wide area STB readings. In addition, when the satellite signal optimization system 100 determines that a large wide area signal degradation issue has occurred, the system also sends alerts or other messages to other operators and/or control centers in the satellite transmission system 102 instructing them not to implement corrective measures, because wide area corrective measures are already in the process of being implemented. Such additional remedial measures by the other operators and/or control centers in the satellite transmission system 102 would only make signal transmission worse in the above described situation, since the attempted "corrections" by the other operators and/or control centers in the satellite transmission system 102 would actually be misaligning (or otherwise deoptimizing) components of the system.

In some embodiments, the satellite signal optimization system 100 also uses advanced algorithms, specifications, calibration baselines, and statistical techniques to analyze the ground segment (i.e., the customer experience data) Signal to Noise data provided by one or more cloud services (e.g., AWS cloud services) in real time. For example, the satellite signal optimization system 100 manages the ground-to-space link performance and reflector pointing performance against design expectations isolated from atmospheric dynamic range detail in real time or in review of archived data. In some embodiments, the design expectations are obtained by the GRID database 167, as described in further detail below.

Using this information, the satellite signal optimization system 100 performs one or more time-stamp identified issues, such as identifying performance trends (e.g., identify parameters that are trending out of acceptable limits, making adjustments before "out of limit measurements" have been reached), and making automated adjustments to eliminate self-inflicted interference. Notably, self-inflicted interference can occur when increasing power to adjust one signal and unintentionally causing interference with another signal. Notably, in some embodiments, the satellite signal optimization system 100 also recommends probable cause indications and engages associated remediation measures, such as initiating redundancies (e.g., activates redundant transmissions or redundant components), engages diverse uplink solutions (e.g., deactivate an uplink antenna from one location and activate an uplink antenna in another diverse location), or guiding catastrophic recovery priority.

In this manner, the satellite signal optimization system 100 provides technological improvements over existing signal transmission monitoring systems. First, the current satellite signal optimization system 100 engages a vastly large network of all end user ground systems that are spread across the large regions, such as the contiguous United States, as well as potentially Alaska, Hawaii, and Puerto Rico. The use of this vastly large network ensures that there are always numerous STBs 110 that have a clear line of sight to the satellite spacecraft 120. Additionally, the use of this vastly large network also ensures that poor performance (or poor configuration issues) from a small number of customer STBs 110 or even a medium sized group of customer STBs 110 does not skew the signal optimization data and lead to inaccurate analysis and conclusions.

Second, the satellite signal optimization system 100 leverages OnPrem databases (e.g., Dashboard 162, MnC database 163, ASM database 164, SITAR database 165, PCA database 166, and GRID database 167) to analyze the telemetry data with high levels of confidence, traceability, and accuracy with reliability assurance to FCC compliance. This enables the satellite signal optimization system 100 to detect anomalies quickly and accurately. This anomaly detection is performed across all models of customer equipment. Significantly, in some embodiments, the satellite signal optimization system 100 calculates probable cause and implements corrective actions (sometimes even before customer awareness) to provide mitigation of impacting events as well as restoration to optimal configurations.

Third, the satellite signal optimization system 100 utilizing remote centralized monitoring and control of highly geographically diverse satellite system components. Thus, the satellite signal optimization system 100 is highly reliable and operates continuously for long periods without out-of-band maintenance cost, networking interruption, single point of failure, or costs associated with travel events for local monitoring. Without the use of the satellite signal optimization system 100, human operators would have to physically travel to numerous remote locations for monitoring and maintenance operations, which is unacceptably slow, potentially physically dangerous, and sometimes not physically possible (e.g., satellite spacecraft reconfiguration and realigning).

Thus, the satellite signal optimization system 100 provides an effective and reliable way to all aspects of the signal distribution process, including the optimization of the space segment throughput availability uptime, as well as determination of the probable cause of signal quality degradation. Additionally, some embodiments of the satellite signal optimization system 100 provide real-time monitoring of space segment performance for C/N+I (Carrier-to-Noise plus Interference) analysis. The satellite signal optimization system 100 then applies control loop parameters to optimize throughput. Additionally, the satellite signal optimization system 100 is further configured to provide alerts of segment failure (e.g., space segment failure due to the satellite spacecraft 120 failing out of position and/or orientation), and even implement remedial action to correct segment failure. Notably, some embodiments of the satellite signal optimization system 100 perform continuous link budget analysis on a larger scale using machine learning, machine oversight, and automated control augmenting.

Not only is the use of machine learning by the satellite signal optimization system 100 more effective, but it also minimizes or removes human engagement requirements, which can involve human safety issues (i.e., human maintenance can be unacceptably dangerous to correct some types of issues). Due to the large quantity of data being obtained from the STBs via the data lake 140, a machine learning engine of the satellite signal optimization system 100 can be effectively trained on the appropriate probable causes and remedial actions to correct identified signal degradation issues. Since the large quantity of data is being continuously obtained from the STBs via the data lake 140, a machine learning engine of the satellite signal optimization system 100 can subsequently and repeatedly be retrained on the appropriate probable causes and remedial actions to correct identified signal degradation issues. Additionally, in some embodiments of the satellite signal optimization system 100, machine learning is implemented to predict and generate configuration change management using the large quantity of data being obtained from the STBs via the data lake 140.

In some embodiments of the satellite signal optimization system 100, the OnPrem architecture includes analysis components such as a frontend Dashboard 162, a Monitor and Control Archive (MnC) Database 163, an Automatic Signal Monitoring (ASM) database 164, a Spectral Image Trap Analysis Recognition (SITAR) Database 165, a Probable Cause Analysis (PCA) Database 166, and Global Resource Information (GRID) Database 167. In some embodiments of the satellite signal optimization system 100, the frontend Dashboard 162 is the data visualize interface. In some such embodiments, the Dashboard 162 unifies the databases 163-167.

In another aspect of some embodiments of the satellite signal optimization system 100, the Monitor and Control Archive (MnC) Database 163 is the archive database that monitors system health. The uplink data and customer data from STBs 110 is continually being offloaded to data lake 140 and OnPrem architecture where it is stored in the PCA Database 166. The penetration heat map 700 is tied in with probable cause software and is looking at the data from the STBs 110 in the PCA Database 166, namely customer experience data, uplink system experience data, fault data at link margins, (pre-fault) trending data, antenna (off-tracking) data, link budget RF energy data (e.g., is the energy getting hotter or weaker than it should be), customer throughput data, and performance data. Additionally, in some embodiments, the PCA Database 166 also stores data relating to signal modulation, organization of analog energy, uplink power control, and signal fade in space. Further, in some embodiments, the PCA Database 166 stores data relating to signal interference (Carrier-to-Noise plus Interference) analysis. Notably, an off-beam signal not only misses its intended receivers, but the signal also interferes with other beams.

In another aspect of some embodiments, the satellite signal optimization system 100 includes an Automatic Signal Monitoring database 164, which is a spectral device that analyzes signal uplink data. The Automatic Signal Monitoring database 164 performs trending analysis for spectral indications, as well as generating triggers and alerts that measurements are out of specification parameters.

In another aspect of some embodiments, the satellite signal optimization system 100 includes a Spectral Image Trap Analysis Recognition database 165, which is a spectral device that analyzes signal data. Specifically, the SITAR database 165 examines spectral indicators, takes measures, generates a virtual device, and analyzes the signal pathway. For example, the satellite signal optimization system 100 expects to see a certain number of RF carriers. Therefore, if the system does not see one of them (or if the signal looks different than it is expected to look), then the system knows there is an issue (i.e., one or more components are operating out of specification parameters). The SITAR database 165 of the satellite signal optimization system 100 can analyze and troubleshoot any component or transmission that has spectral parameters.

In some embodiments of the satellite signal optimization system 100, the SITAR database 165 and ASM Database 164 spectrally analyze the satellite transmission system 102 at various different points along the transmission path (throughout the components of the system from uplink antenna 150 to satellite spacecraft 120 to downlink components to STBs 110). By using spectral indicators, the satellite signal optimization system 100 identifies minor degradations in the satellite transmission system, determines the probable cause of the degradations, and initiates remedial action to correct the degradations.

In this manner, some embodiments of the satellite signal optimization system 100 use spectral indicators from the SITAR database 165 and ASM Database 164 to correct power levels at the carrier, correct signal to noise ratio, reduce signal interference, and the like. Additionally, the satellite signal optimization system 100 can use spectral measurements to detect anomalies in signal frequencies that are outside of their specification parameters. Further, the satellite signal optimization system 100 can use the SITAR database 165 and ASM Database 164 to measure carrier noise, aggregate output power, and aggregate input power, and in response make adjustments (e.g., power levels, signal frequency, component configuration, component selection, etc.) to optimize signal strength without creating interference. For example, the uplink signal can be adjusted by the satellite signal optimization system 100 to prevent self-inflicted interference. In another example, the downlink signal can be adjusted by the satellite signal optimization system 100 to prevent negative effect on satellite signal distribution subscribers.

In still another aspect of some embodiments, the satellite signal optimization system 100 includes a Probable Cause Analysis (PCA) Database 166. The PCA Database 166 analyzes signal degradation issues and determines the probable cause of degradation issues using one or more of truth tables, algorithms, and machine learning. The PCA Database 166 analyzes all potential causes of the signal degradation issues and determines the most likely cause or causes of the signal degradation issues. For example, the PCA Database 166 examines potential signal degradation issues that include modulation issues, directional uplink antenna configuration issues, directional uplink antenna power issues, uplink degradation issues, satellite configuration issues, satellite orientation issues, downlink degradation issues, throughput issues, STBs issues, weather issues, networking issues, maintenance issues, software issues, frequency issues, noise issues, and interference issues.

Notably, in one or more embodiments, the satellite signal optimization system 100 provides alerts of outages, as well as alerts of impending outages before an outage occurs (e.g., by examining parameters that are trending towards a specification boundary). Such alerts by the satellite signal optimization system 100 are very useful in preventing additional self-inflicted signal degradation issues. For example, if a spacecraft beacon goes off point, and the satellite signal optimization system 100 sends an alert that there is a satellite spacecraft issue, the alert may also contain a message to the antenna operators not to move their antennas to try to correct a signal degradation issue that they are experiencing. If the antennas are moved when there is a satellite spacecraft issue, this will only make it harder to correct the satellite spacecraft issue if the antennas are being moved out of position as well.

In yet another aspect of some embodiments, the satellite signal optimization system 100 includes a Global Resource Information (GRID) database 167. In some embodiments of the satellite signal optimization system 100, the GRID database 167 houses all of the specifications for the uplink antennas 150, the satellite spacecraft 120, and signal path/frequency, and the correct number of carriers. Notably, a problem on one carrier may affect up to four other carriers. The GRID database 167 enables the satellite signal optimization system 100 to determine when the components and/or signal transmissions produce measurements that are outside of their specifications. The satellite signal optimization system 100 records and analyzes customer experience data from the STBs 110, and then compares this information against the manufacture's specifications. Since the satellite signal optimization system 100 knows the nominal configuration parameters from the GRID database 167, the satellite signal optimization system 100 can determine if the system components and/or signal transmissions (as seen from the customer experience data via the STBs 110) are out of configuration.

Figure 8:
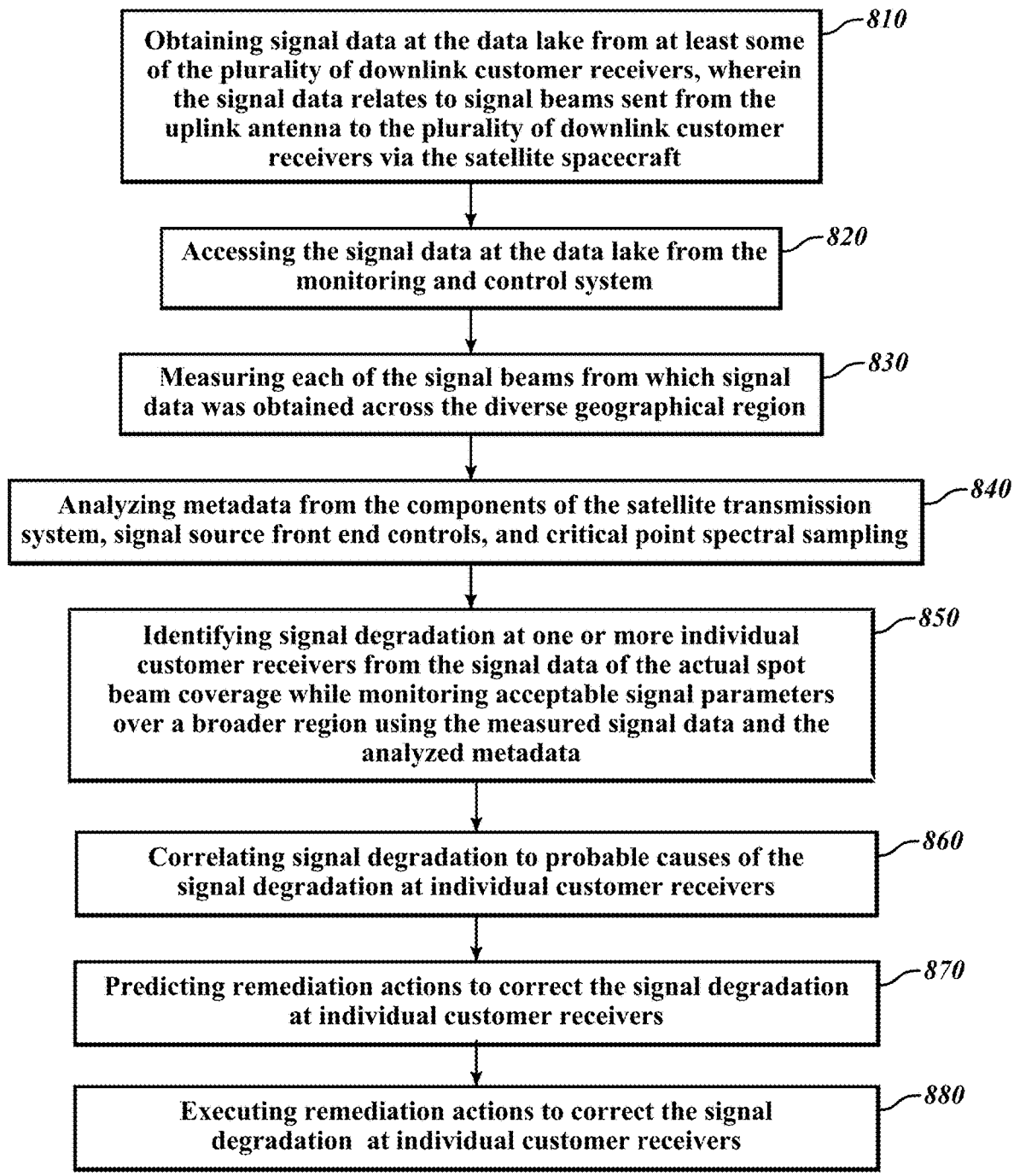
FIG. 8 is a logic diagram showing a method for identifying and correcting STB-related signal degradation.

FIG. 8 is a logic diagram showing a method for monitoring and control of satellite signal performance in a satellite transmission system 102 for signal optimization. Notably, the method for monitoring and control of satellite signal performance shown in FIG. 8 may be implemented by the satellite signal optimization system 100 shown in FIG. 1. As shown in FIG. 1, the components of the satellite transmission system 102 include an uplink antenna 150, a satellite spacecraft 120, a plurality of downlink customer receivers (i.e., STBs) 110, a data lake 140, and an On-Prem monitoring and control system 160. As shown in FIG. 8, at operation 810, signal data is obtained at the data lake 140 from at least some of the plurality of downlink customer receivers 110. The signal data relates to signal beams sent from the uplink antenna 150 to the plurality of downlink customer receivers 110 via the satellite spacecraft 120. Notably, the signal data includes metadata. At optional operation 820, the signal data is accessed at the data lake 140 by the monitoring and control system 160. At operation 830, each of the signal beams is measured from which signal data was obtained across the diverse geographical region. At optional operation 840, metadata is analyzed from the components of the satellite transmission system 102, signal source front end controls, and spectral sampling. At operation 850, signal degradation is identified at one or more individual customer receivers from the signal data of the actual spot beam coverage while monitoring signal parameters over the diverse geographical region using the measured signal data and the analyzed metadata. At optional operation 860, signal degradation issues are correlated to probable causes of the signal degradation at the one or more individual customer receivers. At operation 870, remediation actions are predicted to correct the signal degradation at the one or more individual customer receivers. At optional operation 880, remediation actions are executed to correct the signal degradation at the one or more individual customer receivers.

Figure 9:
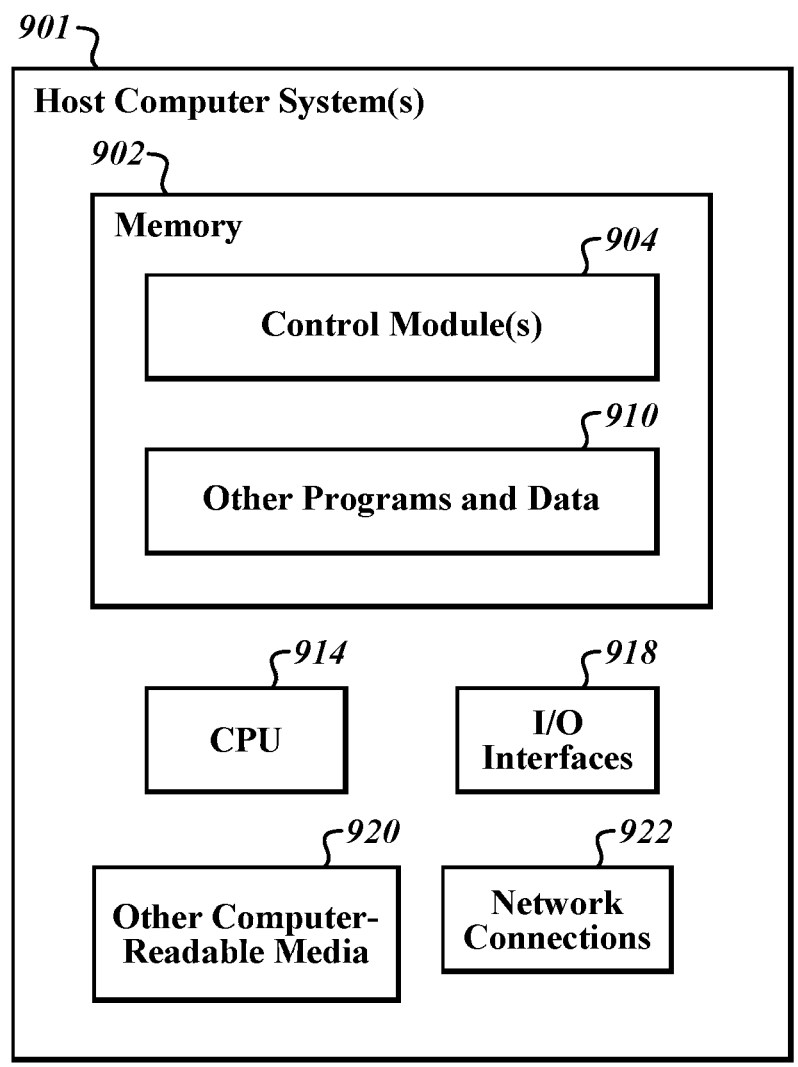
FIG. 9 shows a system diagram that describes an example implementation of a computing system(s) for implementing embodiments described herein.

FIG. 9 shows a system diagram that describes an example implementation of a computing system(s) for implementing embodiments described herein. The functionality described herein for a satellite signal optimization system 100, can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they're agnostic to the underlying cloud infrastructure, allowing higher deployment agility and flexibility.

In particular, shown is example host computer system(s) 901. For example, such computer system(s) 901 may represent those in various data centers and cell sites shown and/or described herein that host the functions, components, microservices and other aspects described herein to implement a satellite signal optimization system 100. In some embodiments, one or more special-purpose computing systems may be used to implement the functionality described herein. Accordingly, various embodiments described herein may be implemented in software, hardware, firmware, or in some combination thereof. Host computer system(s) 901 may include memory 902, one or more processors 914, I/O interfaces 918, other computer-readable media 920, and network connections 922. Notably, the one or more processors 914 may include only a single processor, multiple processors that each execute individual operations, multiple processors that collectively execute individual operations, multiple processors that collectively execute multiple operations, or combinations thereof.

Memory 902 may include one or more various types of non-volatile and/or volatile storage technologies. Examples of memory 902 may include, but are not limited to, flash memory, hard disk drives, optical drives, solid-state drives, various types of random-access memory (RAM), various types of read-only memory (ROM), other computer-readable storage media (also referred to as processor-readable storage media), or the like, or any combination thereof. Memory 902 may be utilized to store information, including computer-readable instructions that are utilized by CPU 914 to perform actions, including those of embodiments described herein.

Memory 902 may have stored thereon control module(s) 904. The control module(s) 904 may be configured to implement and/or perform some or all of the functions of the systems, components and modules described herein for a satellite signal optimization system 100. Memory 902 may also store other programs and data 910, which may include rules, databases, application programming interfaces (APIs), software platforms, cloud computing service software, network management software, network orchestrator software, network functions (NF), AI or ML programs or models to perform the functionality described herein, user interfaces, operating systems, other network management functions, other NFs, etc.

Network connections 922 are configured to communicate with other computing devices to facilitate the functionality described herein. In various embodiments, the network connections 922 include transmitters and receivers (not illustrated), cellular telecommunication network equipment and interfaces, and/or other computer network equipment and interfaces to send and receive data as described herein, such as to send and receive instructions, commands, and data to implement the processes described herein. I/O interfaces 918 may include a video interface, other data input or output interfaces, or the like. Other computer-readable media 920 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for monitoring and control of satellite signal performance in a satellite transmission system, wherein components of the satellite transmission system include an uplink antenna, a satellite spacecraft, a plurality of customer receivers, a data lake, and a monitoring and control system, the method comprising:
   obtaining signal data at the data lake from at least some of the plurality of customer receivers, wherein the signal data is obtained from downlink signal beams received at the plurality of customer receivers from the satellite spacecraft, wherein the plurality of customer receivers are located across a diverse geographical region, and wherein the signal data includes metadata;
   accessing the signal data at the data lake from the monitoring and control system;
   measuring the signal data from each of the signal beams that were obtained across the diverse geographical region;
   analyzing metadata from the components of the satellite transmission system, signal source front end controls, and spectral sampling;
   identifying signal degradation at one or more individual customer receivers from the signal data of actual spot beam coverage while monitoring signal parameters over the diverse geographical region using the measured signal data and the analyzed metadata;
   correlating signal degradation to probable causes of the signal degradation at the one or more individual customer receivers;
   predicting remediation actions to correct the signal degradation at the one or more individual customer receivers; and
   executing the remediation actions to correct the signal degradation at the one or more individual customer receivers.

2. The method of claim 1, wherein at least one of the remediation actions includes correcting misalignment of an antenna of the one or more individual customer receivers.

3. The method of claim 1, wherein at least one of the remediation actions includes correcting software issues with the one or more individual customer receivers.

4. The method of claim 1, wherein at least one of the remediation actions includes correcting frequency issues with the one or more individual customer receivers.

5. The method of claim 1, wherein at least one of the remediation actions includes correcting interference issues with the one or more individual customer receivers.

6. The method of claim 1, further comprising:
   drawing penetration heat map with the signal data from actual spot beam coverage using the measured signal data and the analyzed metadata;
   comparing theoretical spot beam coverage to the actual spot beam coverage on the penetration heat map; and
   identifying signal degradation from the penetration heat map drawn from the signal data of the actual spot beam coverage and the comparison to the theoretical spot beam coverage.

7. The method of claim 1, wherein an artificial intelligence engine is trained with the signal data from the actual spot beam coverage.

8. The method of claim 7, further comprising using artificial intelligence to redraw a penetration heat map with newly acquired signal data from the actual spot beam coverage.

9. The method of claim 1, wherein at least one of the remediation actions includes sending a message to components that have been determined not to be a source of identified signal degradation that no corrective action is required for those components.

10. The method of claim 1, wherein at least one of the remediation actions includes blocking components that have been determined not to be a source of identified signal degradation from taking a corrective action.

11. A system for monitoring and control of satellite signal performance in a satellite transmission system, the system comprising:
   one or more processors; and
   a memory device storing a set of instructions that, when executed by the one or more processors, causes the one or more processors to:
      obtain signal data at a data lake from at least some of a plurality of customer receivers, wherein the signal data is obtained from downlink signal beams received at the plurality of customer receivers from the satellite spacecraft, wherein the plurality of customer receivers are located across a diverse geographical region, and wherein the signal data include metadata;
      access the signal data at the data lake from the monitoring and control system;
      measure the signal data from each of the signal beams that were obtained across the diverse geographical region;
      analyze metadata from components of the satellite transmission system, signal source front end controls, and spectral sampling;

identify signal degradation at one or more individual customer receivers from the signal data of actual spot beam coverage while monitoring signal parameters over the diverse geographical region using the measured signal data and the analyzed metadata;

correlate signal degradation to probable causes of the signal degradation at the one or more individual customer receivers;

predict remediation actions to correct the signal degradation at the one or more individual customer receivers; and execute the remediation actions to correct the signal degradation at the one or more individual customer receivers.

12. The system of claim 11, wherein at least one of the remediation actions includes correcting misalignment of an antenna of the one or more individual customer receivers.

13. The system of claim 11, wherein at least one of the remediation actions includes correcting software issues with the one or more individual customer receivers.

14. The system of claim 11, wherein at least one of the remediation actions includes correcting frequency issues with the one or more individual customer receivers.

15. The system of claim 11, wherein at least one of the remediation actions includes correcting interference issues with the one or more individual customer receivers.

16. The system of claim 11, wherein the memory device stores further instructions that, when executed by the one or more processors, further cause the one or more processors to:

draw penetration heat map with the signal data from actual spot beam coverage using the measured signal data and the analyzed metadata;

compare theoretical spot beam coverage to the actual spot beam coverage on the penetration heat map; and identify signal degradation from the penetration heat map drawn from the signal data of the actual spot beam coverage and the comparison to the theoretical spot beam coverage.

17. The system of claim 16, wherein an artificial intelligence engine is trained with the signal data from the actual spot beam coverage to redraw the penetration heat map with newly acquired signal data from the actual spot beam coverage.

18. The system of claim 11, wherein at least one of the remediation actions includes sending a message to components that have been determined not to be a source of identified signal degradation that no corrective action is required for those components.

19. The system of claim 11, wherein at least one of the remediation actions includes blocking components that have been determined not to be a source of identified signal degradation from taking a corrective action.

20. A method for monitoring and control of satellite signal performance in a satellite transmission system for signal optimization, the method comprising:

obtaining signal data from at least some of a plurality of customer receivers, wherein the signal data is obtained from downlink signal beams received at the plurality of customer receivers from the satellite spacecraft, wherein the plurality of customer receivers are located across a diverse geographical region;

measuring the signal data from each of the signal beams that were obtained from the plurality of customer receivers;

analyzing metadata from components of the satellite transmission system, signal source front end controls, and spectral sampling;

identifying signal degradation at one or more individual customer receivers from the signal data of actual spot beam coverage while monitoring signal parameters over the diverse geographical region using the measured signal data and the analyzed metadata; and predicting a remediation action to correct the signal degradation at the one or more individual customer receivers.

* * * * *